United States Patent [19]

Beasley, Jr. et al.

[11] Patent Number: 5,604,834
[45] Date of Patent: *Feb. 18, 1997

[54] METHOD OF MIDSPAN AND/OR END ENTRY TO ACCESS SELECTED OPTICAL FIBERS WITHIN AN OPTICAL RIBBON FIBER

[75] Inventors: William E. Beasley, Jr.; Taichiro Nagao, both of Durham, N.C.

[73] Assignee: Sumitomo Electric Lightwave Corp., Research Triangle Park, N.C.

[ * ] Notice: The term of this patent shall not extend beyond the expiration date of Pat. No. 5,460,682.

[21] Appl. No.: 333,423

[22] Filed: Nov. 2, 1994

Related U.S. Application Data

[63] Continuation-in-part of Ser. No. 260,713, Jun. 16, 1994, Pat. No. 5,460,682.

[51] Int. Cl.$^6$ .............................. G02B 6/44; B32B 35/00
[52] U.S. Cl. ......................... 385/114; 385/134; 156/344; 156/584; 451/49
[58] Field of Search ....................... 385/112, 114, 385/115, 134; 81/9.4; 156/55, 344, 584; 451/49, 54, 365

[56] References Cited

U.S. PATENT DOCUMENTS

| | | | |
|---|---|---|---|
| 4,046,298 | 9/1977 | Schroeder, Jr. | 385/114 |
| 4,547,040 | 10/1985 | Yamamoto et al. | 385/114 X |
| 4,630,887 | 12/1986 | Taylor | 385/114 |
| 4,828,349 | 5/1989 | Nakasuji | 385/126 |
| 4,844,604 | 7/1989 | Bishop et al. | 385/115 |
| 4,900,126 | 2/1990 | Jackson et al. | 385/114 |
| 4,906,067 | 3/1990 | Mayr et al. | 385/112 |
| 4,930,860 | 6/1990 | Tansey et al. | 385/106 |
| 4,953,945 | 9/1990 | Nishimura et al. | 385/114 |
| 5,082,347 | 1/1992 | Akasaka et al. | 385/114 |
| 5,327,513 | 7/1994 | Nguyen et al. | 385/114 |
| 5,369,720 | 11/1994 | Parry et al. | 385/114 |

FOREIGN PATENT DOCUMENTS

| | | | |
|---|---|---|---|
| 63-56609 | 3/1988 | Japan | 385/114 |
| 63-316804 | 12/1988 | Japan | 385/114 |
| 2-46411 | 2/1990 | Japan | 385/114 |

*Primary Examiner*—Rodney B. Bovernick
*Assistant Examiner*—Hemang Sanghavi
*Attorney, Agent, or Firm*—Richard E. Jenkins, P.A.

[57] ABSTRACT

A method of midspan or end entry accessing of one or more selected optical fibers carried by an optical ribbon fiber. The top and bottom surfaces of a first selected span of the optical ribbon fiber are friction abraded to initiate delamination of the bond between the optical fibers and the matrix encapsulant. The delamination is completed by applying a rolling force to the circumference of the first selected span, and the delamination is then propagated by introducing the first selected span into the bore of a die element and urging the die element along a relatively longer second selected span of the optical ribbon fiber. With the delamination completed, the tip of an elongated tool is inserted through the encapsulant within the second selected span and between one or more selected optical fibers and the remaining optical fibers within the optical ribbon fiber. Next, the tip of the elongated tool is lifted from within the encapsulant so as to remove the one or more selected optical fibers from the encapsulant, and the elongated tool inserted between the encapsulant and the one or more selected optical fibers. Finally, the elongated tool is slidably urged along the length of the delaminated second selected span to lift the optical fibers out of the encapsulant for access as necessary.

16 Claims, 9 Drawing Sheets

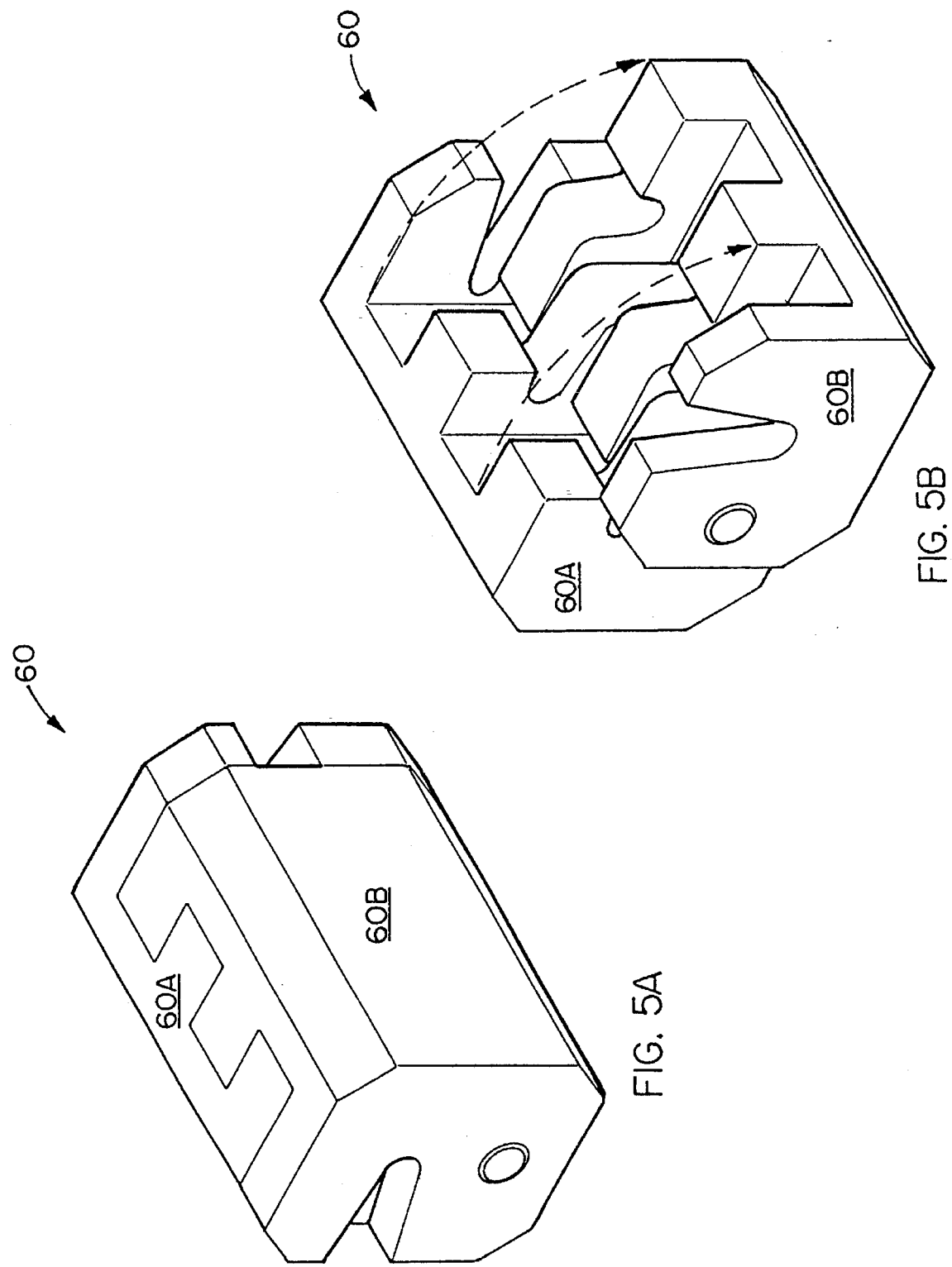

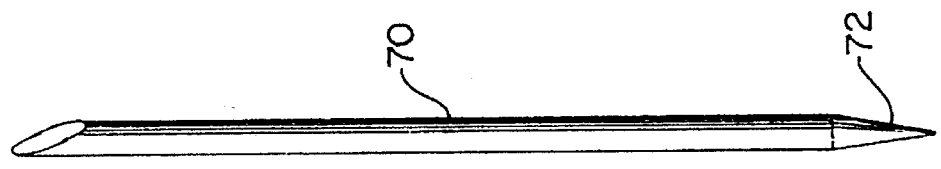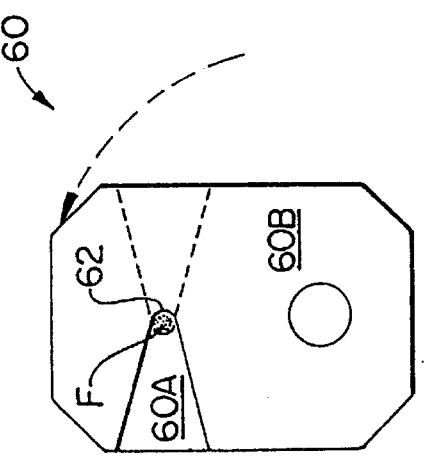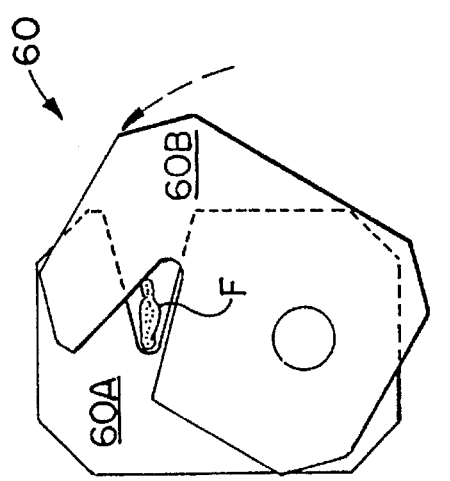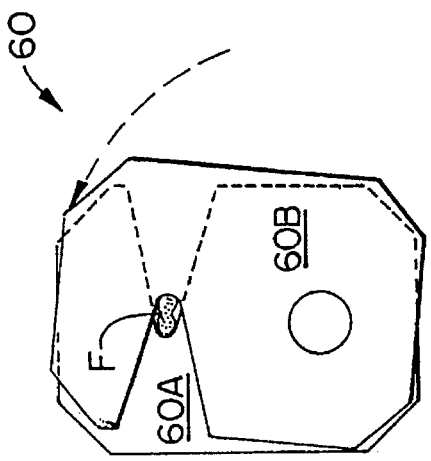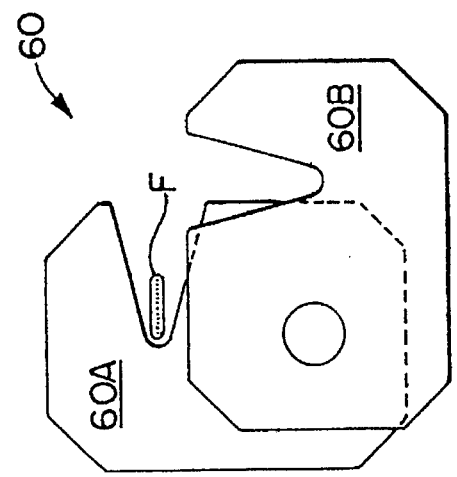

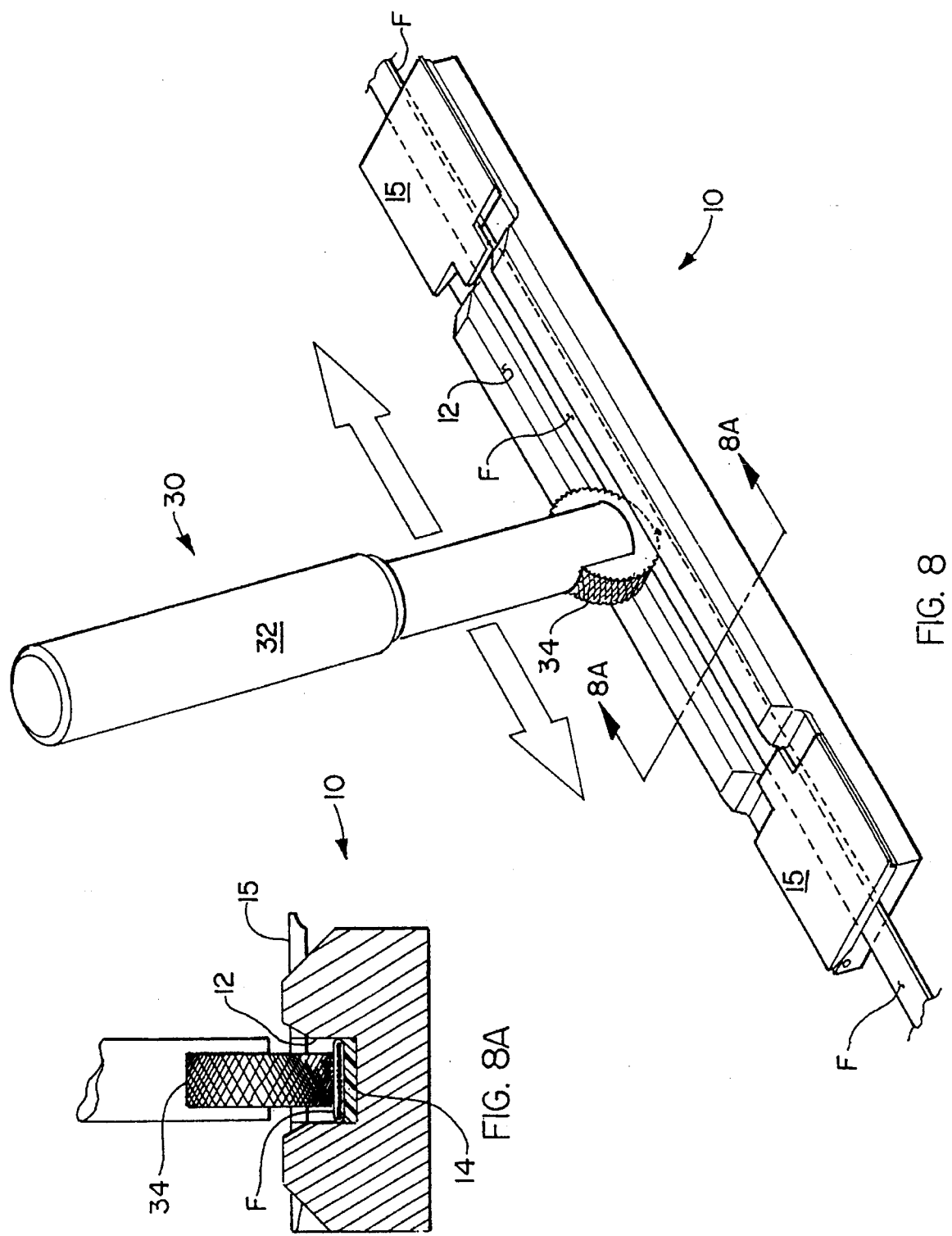

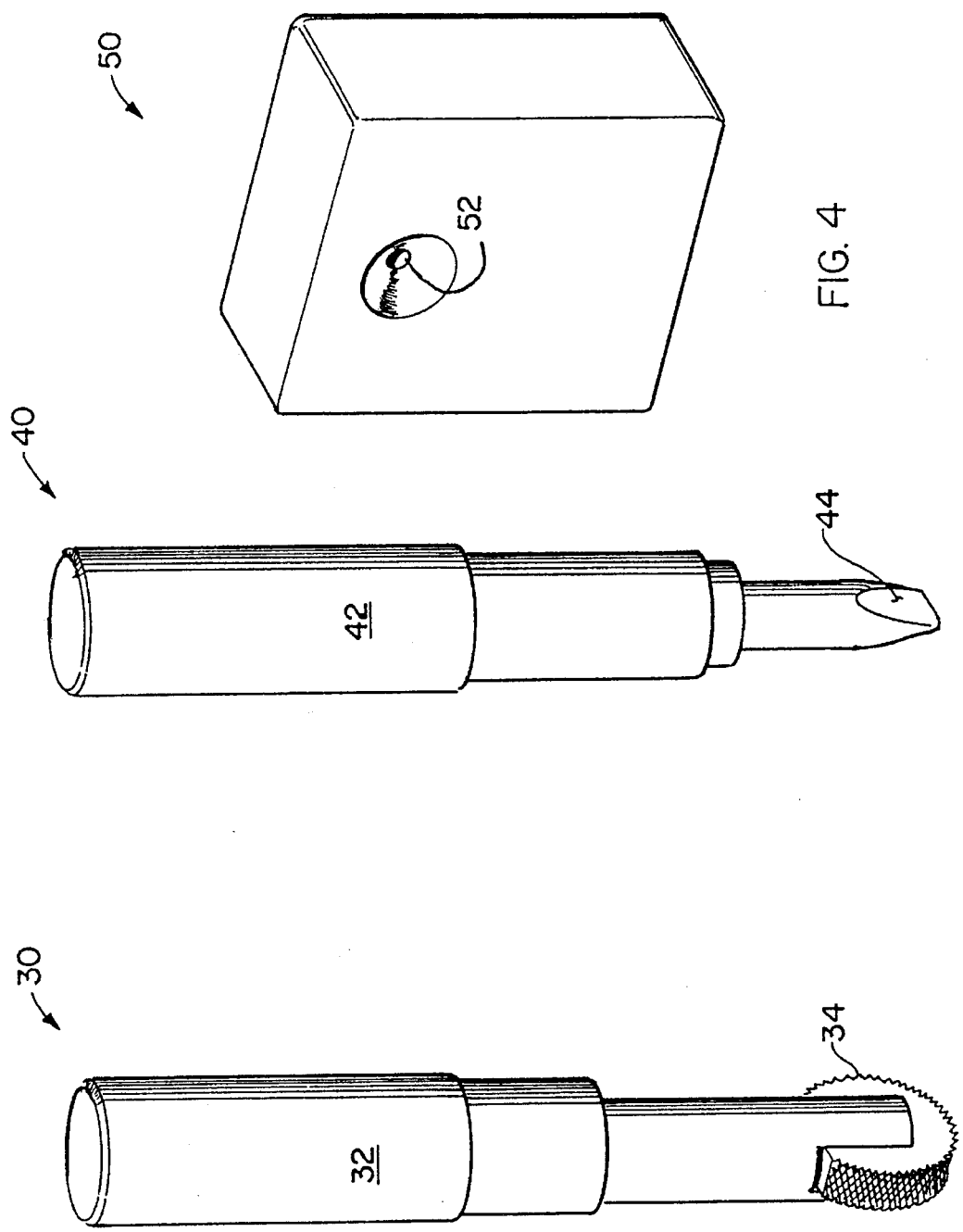

METHOD OF MIDSPAN AND/OR END ENTRY TO ACCESS SELECTED OPTICAL FIBERS WITHIN AN OPTICAL RIBBON FIBER

RELATED APPLICATIONS

This application is a continuation-in-part application of U.S. patent application Ser. No. 08/260,713 filed Jun. 16, 1994, and now U. S. Pat. No. 5,460,682.

FIELD OF THE INVENTION

The present invention relates to optical ribbon fiber, and more particularly to a method useful for midspan or end entry of an optical ribbon fiber to access one or more selected optical fibers from the plurality of optical fibers carried by the optical ribbon fiber.

DESCRIPTION OF THE RELATED ART

Optical ribbon fiber is an optical fiber cable that has recently become quite popular for use in the United States. Unlike conventionally utilized loose tube optical cables wherein the 250 micrometer color-coded fibers are placed relatively loosely inside a gel filled plastic tube, ribbon cables contain a plurality of optical ribbon fibers. Optical ribbon fibers normally incorporate multiple 250 micrometer color-coded fibers (typically 12 in the Unites States) which are held together in the form of a flat linear matrix by an ultraviolet (UV) curable encapsulant material. Although different materials can be utilized for the matrix, the matrix is most suitably formed from acrylate resins as is well known to one skilled in the fiber optic art. The tight packing density of the optical ribbon fiber advantageously provides for high fiber count in a relatively small diameter ribbon cable. However, a shortcoming of the optical ribbon fiber used in ribbon cables is the difficulty of midspan access to selected fibers in the optical ribbon fiber. For example, in order to enter a pre-installed ribbon cable at an intermediate position between its length in order to access one or more selected optical fibers therein without cutting or damaging the surrounding optical fibers has been extremely difficult.

The fiber optic industry has more or less dictated the following requirements for acceptable optical ribbon fiber midspan entry:

1. Full flexibility to access any one or more fibers within the optical ribbon fiber structure.
2. Access of the one or more selected optical fibers must be performed without cutting any of the optical fibers in the optical ribbon fiber structure.
3. The midspan access procedure must not impart damage to optical fibers or optical fiber coatings (which could result in a degradation of an optical fiber's longevity and/or reliability).
4. The midspan access procedure cannot impart damage to any individual optical fiber's color coating.
5. The midspan access procedure cannot cause attenuation increase in any live optical fibers contained within the optical ribbon fiber during the procedure.

As is probably known to those skilled in the fiber optic art, efforts have been made to gain midspan entry by soaking optical ribbon fiber in a solvent gel and then wiping off the softened matrix material with a rough pad or the like. However, this procedure has proven to be messy, time consuming, unreliable, limited to a very relatively short region of midspan entry, and does not act to retain optical fiber color coatings. Thus, this procedure has many shortcomings and is not commercially acceptable.

Other techniques for midspan entry of a ribbon cable include splitting an optical ribbon fiber of interest into multiple ribbons. However, this procedure has not proven satisfactory in use since it does not remove the matrix encapsulant material from the entire optical ribbon fiber and thus limits flexibility with respect to which optical fibers can be accessed. Also, efforts have been made to gain midspan access to selected fibers within an optical ribbon fiber by utilizing a blade to shave selected matrix encapsulant material from the area of interest. However, this technique has proven to be unreliable in use and thus unsatisfactory for commercial application.

Thus, there is a great need in the fiber optic art for a simple and reliable procedure for midspan accessing of one or more selected optical fibers of an optical ribbon fiber. Applicant has unexpectedly and surprisingly discovered an extremely effective procedure to meet this need, and the procedure is described in specific detail hereinbelow.

DISCLOSURE OF THE INVENTION

In accordance with the teachings of the present invention, the problem of simple and reliable midspan accessing of one or more selected optical fibers carried within an optical ribbon fiber within a optical cable has been overcome. The improved method for midspan entry (which can also be used for end entry) of an optical ribbon fiber includes friction abrading of the top and bottom surfaces of a first selected span of the optical ribbon fiber to initiate the delamination of the bond between the optical fibers carried within the optical ribbon fiber and the matrix encapsulant therearound. The delamination of the bond is completed in the first selected span of the optical ribbon fiber by applying a rolling force to the circumference of the span. Next, the delamination of the bond between the optical fibers and the encapsulant therearound in the first selected span is propagated by introducing the first selected span into the bore of a die element and then urging the die element along a relatively lengthier second selected span of the optical ribbon fiber. Optionally, the die may be then pulled back along the length of the second selected span and returned to its original starting position in order to best propagate the delamination.

The tip of an elongated tool is then inserted through the encapsulant of a selected area within the second selected span and between (1) one or more selected optical fibers of interest and (2) the remaining optical fibers carried within the optical ribbon fiber so that the one or more selected optical fibers extend across the top surface of the elongated tool tip. Next, the tip of the elongated tool is lifted from within the encapsulant of the optical ribbon fiber so as to remove the one or more selected optical fibers from the encapsulant, and the elongated tool is inserted between the encapsulant and the one or more selected optical fibers so that the optical fibers extend thereover. Finally, the elongated tool is slidably urged along the length of the delaminated second selected span so as to lift the one or more selected optical fibers out of the encapsulant of the second selected span to facilitate access thereto.

Although the novel procedure is particularly well adapted for midspan access of selected optical fibers within an optical ribbon fiber the process may also be utilized for easier and more reliable end entry of an optical ribbon fiber.

It is therefore the object of the present invention to provide an improved midspan access procedure for an optical ribbon fiber.

It is another object of the present invention to provide an improved end entry procedure for an optical ribbon fiber.

It is another object of the present invention to provide a simple and highly reliable technique for midspan entry of an optical ribbon fiber of a ribbon cable to facilitate accessing selected optical fibers within the optical ribbon fiber without any damage to either the selected optical fibers or the remaining optical fibers within the optical ribbon fiber.

It is still another object of the present invention to provide a procedure for midspan or end access to an optical ribbon fiber so as to separate and remove only selected optical fibers without any damage to the optical ribbon fiber and while the optical ribbon fiber is in use.

Some of the objects of the invention having been stated hereinabove, other objects will become evident as the description proceeds, when taken in connection with the accompanying drawings, which are described hereinbelow.

BRIEF DESCRIPTION OF THE DRAWINGS

FIGS. 6A–6D are end elevation views of the second shell die tool shown in FIGS. 5A–5B being closed upon an optical ribbon fiber so as to contain the optical ribbon fiber within a bore defined therein;

FIG. 7 is a perspective view of an extraction tool used in the preferred embodiment of the present invention;

FIG. 8 shows a perspective view of the friction abrading step of the present invention;

FIG. 8A is a view taken on the line 8A-8A of Figure for better clarity of understanding;

FIG. 11 shows a perspective view of the elongated tool insertion step of the present invention wherein selected optical fibers of interest are separated from the remaining optical fibers within the optical ribbon fiber;

FIG. 12 shows a perspective view of the final step of the present invention wherein the elongated tool is forcibly urged along the length of the entire delaminated portion of the optical ribbon fiber to remove the optical fibers of interest once the tip of the elongated tool has been removed from the encapsulant and the tool inserted between the optical fibers of interest and the encapsulant tube with the remaining optical fibers contained therein;

BEST MODE FOR CARRYING OUT THE INVENTION

Referring now to FIGS. 1–14, applicant will describe the novel procedure of the subject invention in detail for the complete understanding of one skilled in the fiber optic art.

Figure 1:
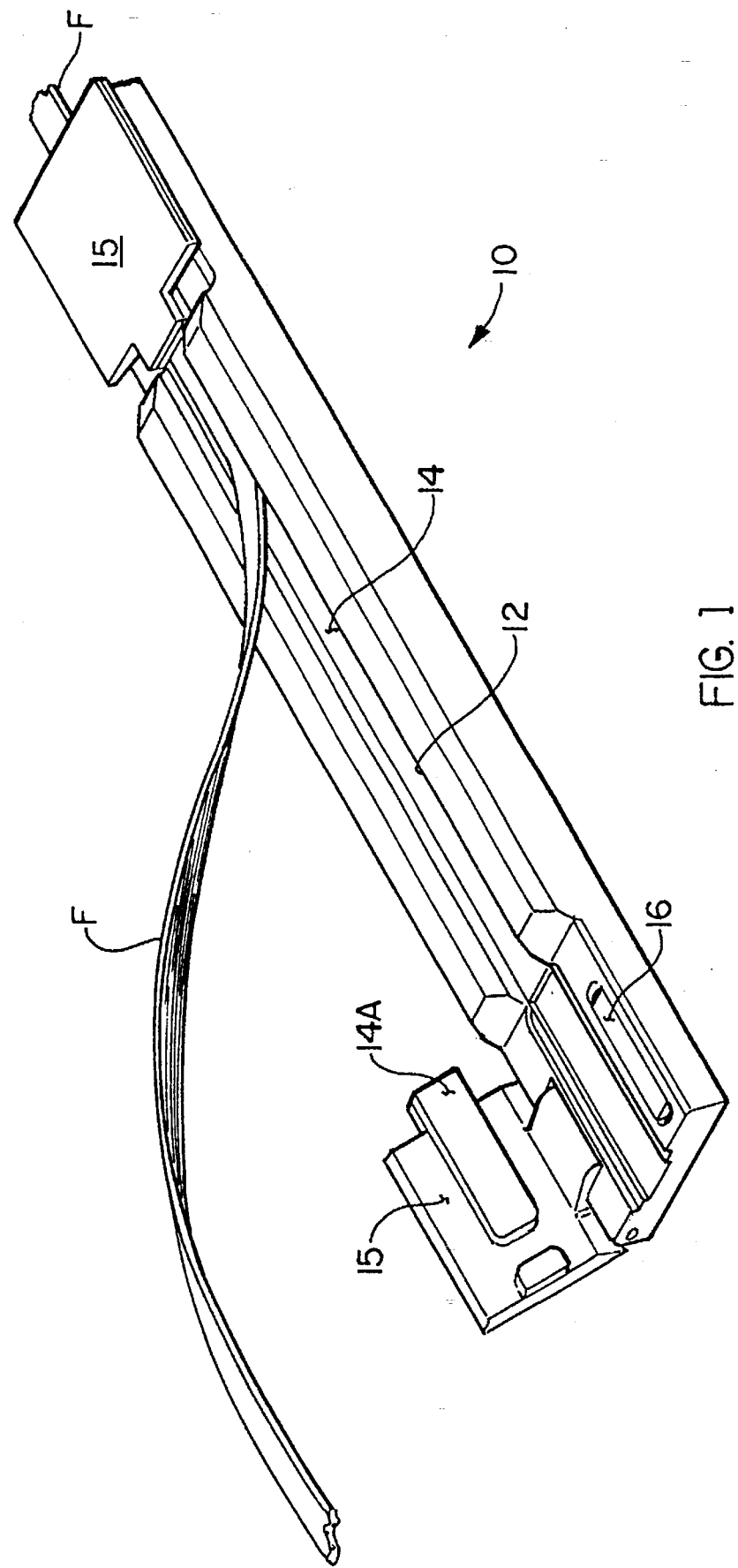
FIG. 1 is a perspective view of an optical ribbon fiber securement tool used in the preferred embodiment of the present invention.

Applicant's subject invention is practiced with a plurality of tools which will now be described. With particular reference to FIGS. 1, 8 and 8A, base plate 10 can be seen which serves to retain optical ribbon fiber F therein during the friction abrading or fatiguing step of applicant's inventive method which will be described in detail hereinafter. Base plate 10 comprises a channel or groove 12 extending along the length thereof and which serves to contain optical ribbon fiber F therein and to guide a suitable friction abrading tool (see FIGS. 2 and 3) along a predetermined length of optical ribbon fiber F (see FIG. 8). Base plate 10 further comprises a resilient pad 14 positioned in the bottom of groove 12 to provide a friction surface to facilitate the friction abrading or fatiguing step of applicant's inventive procedure. Although other materials could be utilized, resilient pad 14 is most suitably formed from thermoplastic rubber. Also, base plate 10 is provided with a pivotably mounted clamp 15 at each end thereof for fixedly securing optical ribbon fiber F within groove 12 during use of base plate 10 for the friction abrading or fatiguing step. Clamps 15 are fabricated from metal and secured in a closed position at each end of base plate 10 by conventional magnet 16. Clamp 15 is further provided with a resilient pad 14A which is fixed to clamp 14 in such a position as to contact the top surface of optical ribbon fiber F in groove 12 when clamp 14 is pivotably closed. Pad 14A may be formed of any suitable resilient material, but applicant contemplates that the preferred material is thermoplastic rubber.

Figure 3:
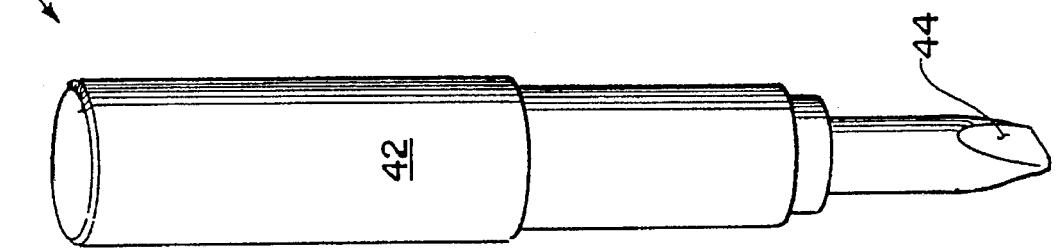
FIG. 3 is a perspective view of another abrading tool used in the preferred embodiment of the present invention.
Figure 2:
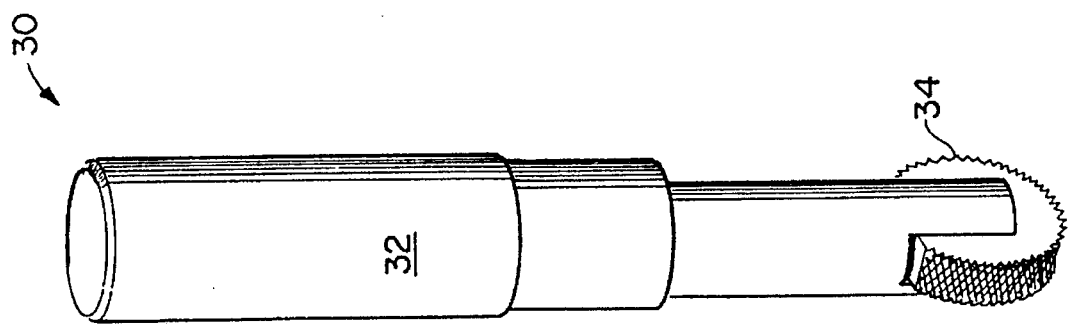
FIG. 2 is a perspective view of an abrading tool used as the preferred embodiment of the present invention.
Figure 10:
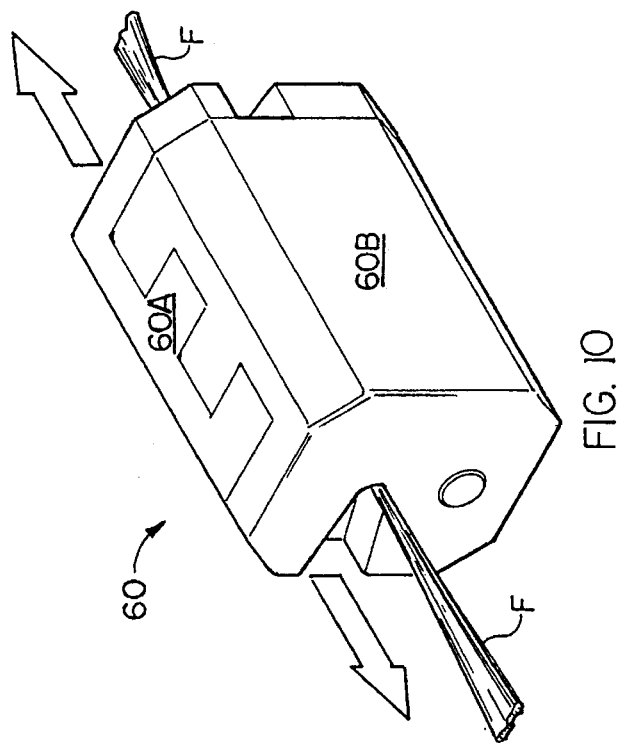
FIG. 10 shows a perspective view of the delamination propagating step of the present invention.
Figure 9:
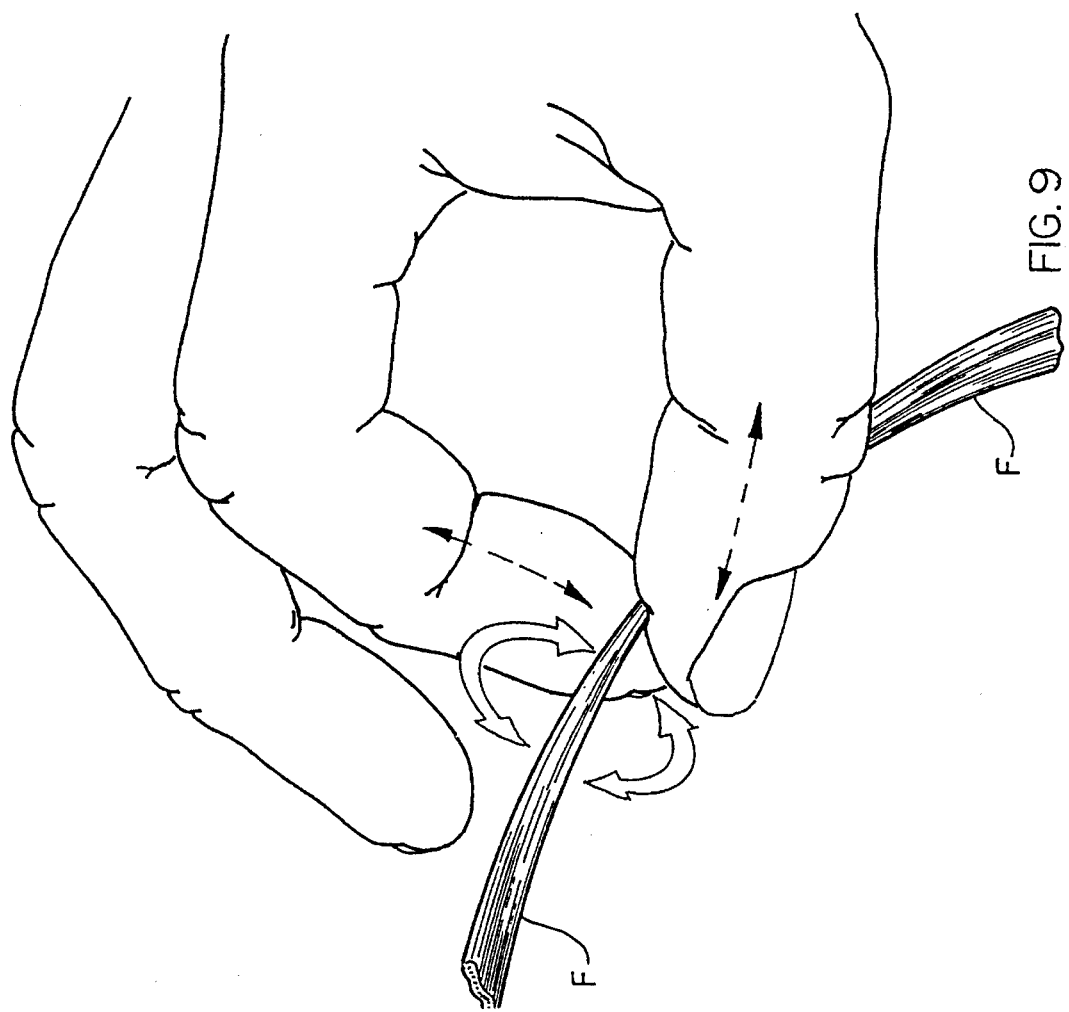
FIG. 9 shows a perspective view of the delamination completing step of the present invention.
Figure 1:
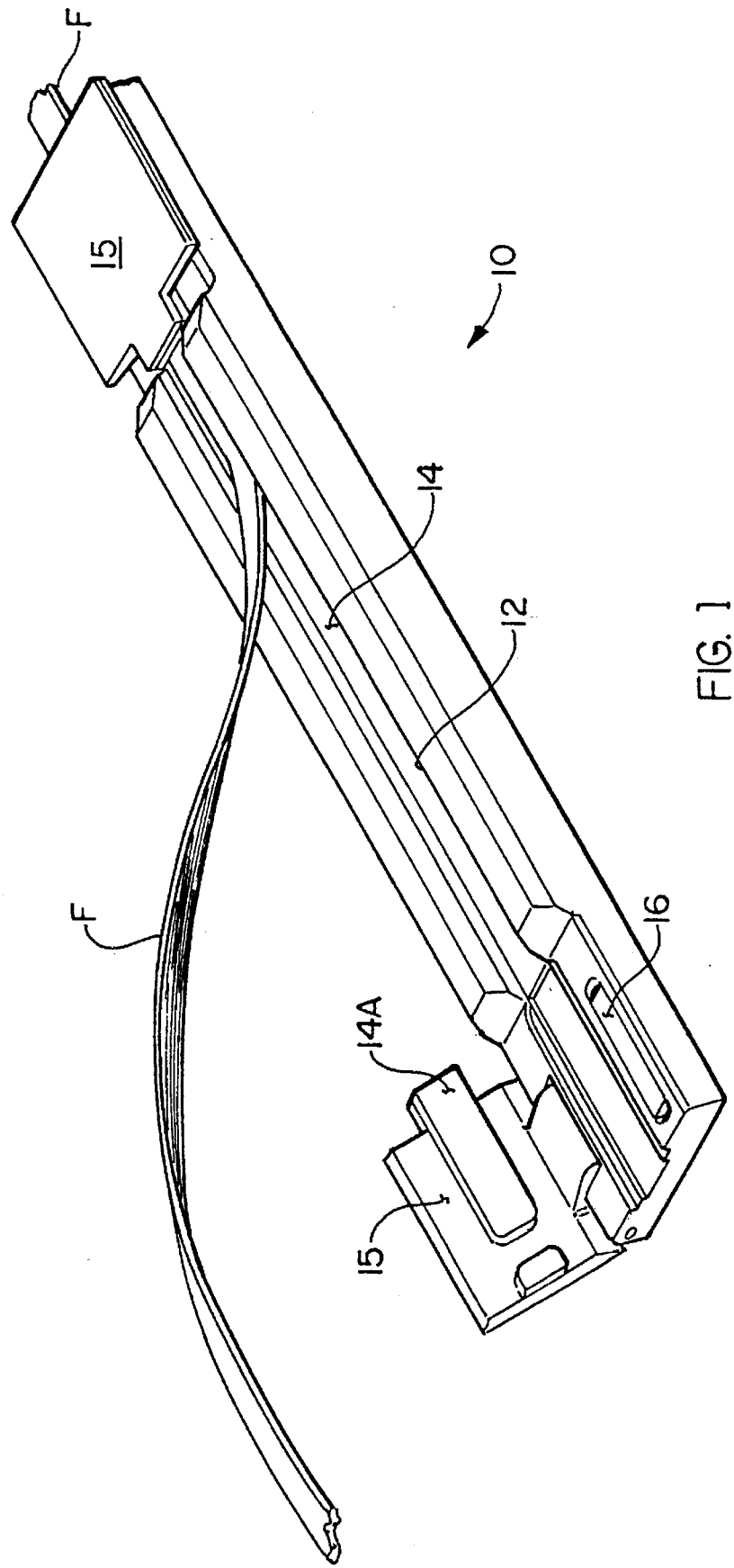
Figure 5B:
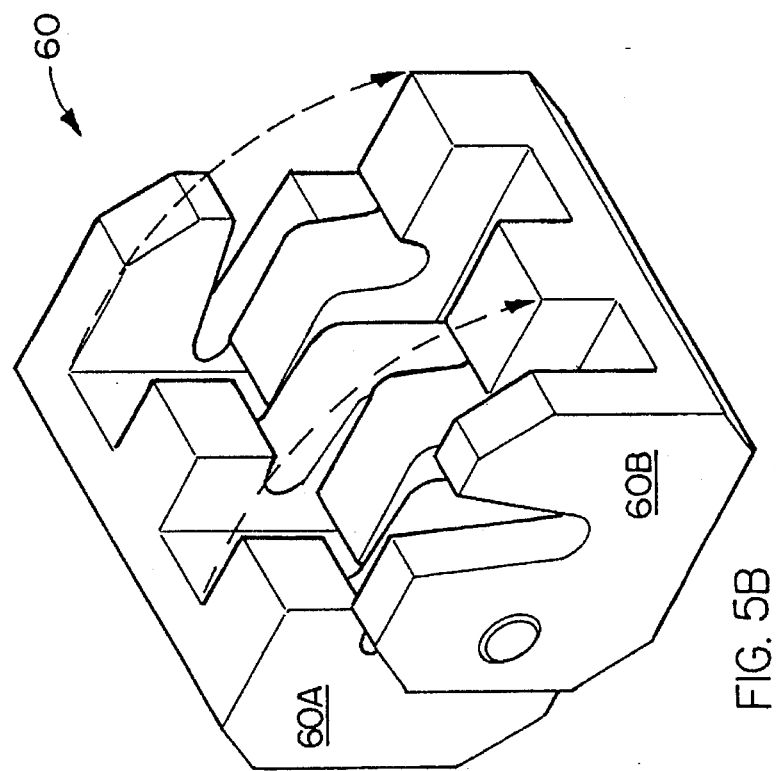
FIGS. 5A–5B are perspective views of a second die tool used in the preferred embodiment of the present invention.
Figure 5A:
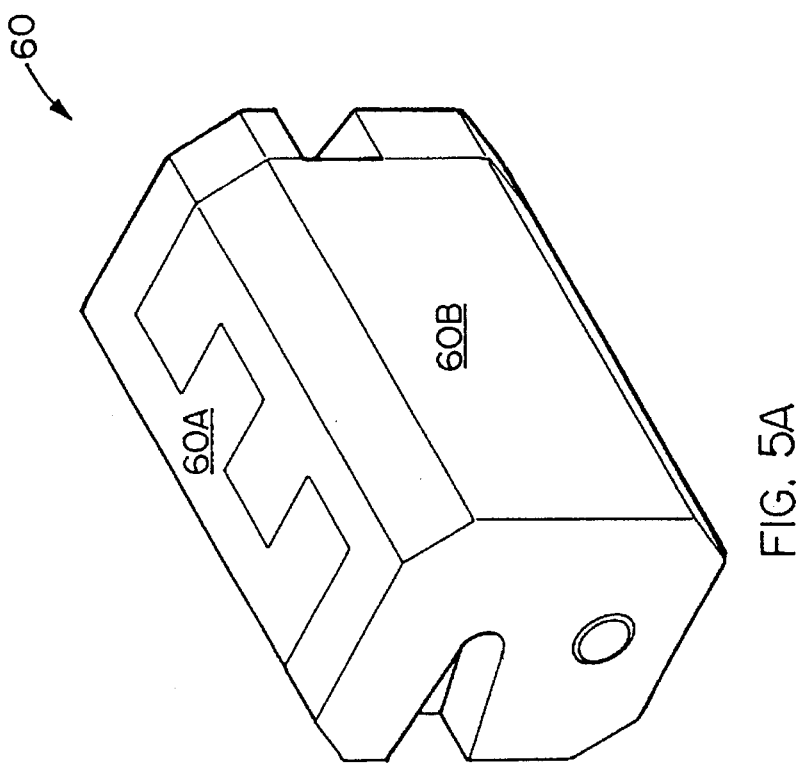

With reference now to FIGS. 2 and 3, representative friction abrading tools 30 and 40, respectively, are shown which can be used in practicing applicant's inventive process. Friction abrading tool 30 comprises a handle portion 32 and a fixed high friction disk 34 at the end thereof for abrading optical ribbon fiber F while in base plate 10 in a manner which will be described in more detail hereinbelow. Similarly, friction abrading tool 40 comprises a handle portion 42 and a chisel-like tip 44 for friction abrading of optical ribbon fiber F while in base plate 10. Moreover, although friction abrading tools 30 and 40 are shown in FIGS. 2 and 3 of the drawings, applicant contemplates that other similar tools can be utilized which serve to fatigue the matrix encapsulant of optical ribbon fiber F.

Figure 4:
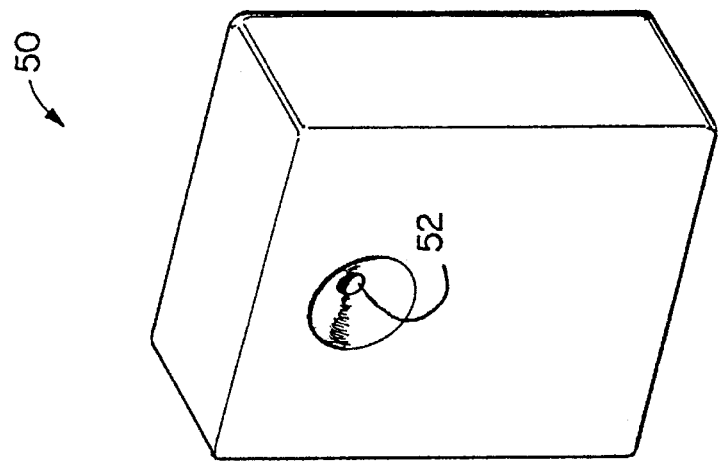
FIG. 4 is a perspective view of a die tool used in the preferred embodiment of the present invention.

Referring now to FIGS. 4–6, two preferred embodiments of applicant's die tool are shown, although other die tools could be utilized to serve to propagate delamination of the bond between the optical fibers (OF in FIGS. 11 and 12) and the matrix encapsulant (not shown) of optical ribbon fiber F. Referring now particularly to FIG. 4, a conventional die is shown having a tapered entrance and exit leading to bore 52 thereof. Although other bore sizes are possible, applicant has discovered that bore 52 most suitably has a diameter between 0.055 and 0.065 inches in order to possess the highest efficacy in acting to complete delamination of conventional optical ribbon fiber F carrying twelve (12) optical fibers 0F therein. Of course, applicant's novel process can be utilized on other optical ribbon fibers F manufactured and sold by Sumitomo Electric Fiber Optics Corp. as well as on other optical ribbon fibers F manufactured and sold by other manufacturers of this product so long as a suitable die bore size is utilized which will effect the desired delamination of fiber F.

It should be appreciated that die 50 shown in FIG. 4 is primarily intended-for end entry accessing of optical ribbon fiber F whereas clam shell die 60 shown in FIGS. 5A, 5B and 6A–6D is intended to be used for midspan accessing of selected optical fibers OF within optical ribbon fiber F in accordance with the teachings of the instant invention. Clam shell die 60 is constructed so as to be pivotally opened and a midspan portion of optical ribbon fiber F inserted therein (see particularly FIGS. 6A–6D) and clam shell die 60 then closed so as to define a bore 62 therein which acts to roll optical ribbon fiber F into a tight cylindrical bundle so as to facilitate completion of the delamination of the bond between optical fibers OF and the encapsulant of optical ribbon fiber F in accordance with applicant's novel process. As with die 50, die 60 is most suitably contemplated as having a bore diameter between about 0.055 and 0.065 inches for an optical ribbon fiber F having twelve (12) optical fibers 0F therein. However, other die bore sizes could be utilized as a matter of design choice for other size optical ribbon fibers F manufactured by Sumitomo Electric Fiber Optics Corp. or by other optical ribbon fiber F manufacturers. However, it should be appreciated that the diameter of bore 62 is critical in that it must be selected so as to urge optical ribbon fiber F into a sufficiently tight and annular configuration as to serve to propagate the delamination of the bond between the optical fibers and the encapsulant of optical ribbon fiber F when used in the process of applicant's invention.

Finally, applicant's inventive procedure described herein for improved midspan (or end entry) of optical ribbon fiber F contemplates use of hand-held extraction tool 70 as shown in FIGS. 7 and 11–12. Extraction tool 70 is most suitably a non-metallic object with a pointed tip 72. Although other extraction tools 70 may be utilized, applicant contemplates that the preferred extraction tool 70 is formed from a wood stick such as shown in FIG. 7 and will be used to practice applicant's novel invention as described in more detail hereinbelow.

In use, the tools described hereinbefore will serve to provide an improved method for midspan or end entry of an optical ribbon fiber F to access one or more of a larger number of optical fibers OF carried within optical ribbon fiber F. Also, and as is well known to those skilled in the art, a plurality of optical ribbon fibers F would normally be incorporated into a ribbon cable (not shown) such as LITEPIPE™, ARMORLUX® and ADS™ sheath cables manufactured and sold by Sumitomo Electric Fiber Optics. Corp. of Research Triangle Park, N.C. Applicant's method could, of course, also be utilized for midspan or end entry of optical ribbon cables manufactured by other companies. Referring particularly to FIGS. 8–12 which clearly depict the process of the invention, one can appreciate the novel method for midspan or ribbon end entry of optical ribbon fiber F by fatiguing the bond between the optical fibers and encapsulant matrix material and thereafter accessing selected optical fibers OF within the bundle of optical fibers carried by optical ribbon fiber F. The novel procedure allows for the reliable and relatively easy separation and removal of selected optical fibers OF from a larger plurality of optical fibers within optical ribbon fiber F.

First of all, optical ribbon fiber F is placed into groove 12 of base plate 10 and each of clamps 15 pivotally closed thereon to secure optical ribbon fiber F in place. Next, friction abrading tool 30 is used to friction abrade the top surface of optical ribbon fiber F with short, reciprocating strokes along the length of exposed fiber F in groove 12 of base plate 10 (see FIG. 8). The action of the knurled surface of disk 34 in conjunction with resilient pad 14 positioned beneath optical ribbon fiber F acts to apply fatiguing stresses to the optical ribbon fiber so as to weaken the bond between the optical fibers and the matrix encapsulant of optical ribbon fiber F. Once one side of optical ribbon fiber F has been friction abraded by tool 30, clamps 14 are pivotally opened, optical ribbon fiber F turned over, and clamps 14 closed thereon so as to repeat the friction abrading step on the other side of fiber F. At this point, the bond between the optical fibers and the matrix encapsulant of optical ribbon fiber F has been weakened, and complete delamination of the first selected span of optical ribbon fiber F is achieved by pinching fiber F between the fingers and slightly rolling it (see FIG. 9). This action serves to complete the delamination of the bond between the optical fibers and the matrix encapsulant of optical ribbon fiber F and leaves the loose optical fibers OF in a "bag" or "tube" of matrix encapsulant material.

Next, the delamination achieved in the first selected span of optical ribbon fiber F as described above is propagated by placing the delaminated first selected span into the bore of a die and pulling optical ribbon fiber F therethrough to force the delamination along a longer second selected span by means of geometry distortion. For ribbon end entry, die 50 shown in FIG. 4 can be utilized. For the much more difficult midspan entry which the present invention is particularly contemplated to address, clam shell die 60 is utilized. Die 60 is comprised of first and second interlocking clam shell halves 60A and 60B, respectively, which are enclosed around the first selected midspan delaminated portion of optical ribbon fiber F (see particularly FIGS. 6A–6D). Clam shell die 60 is designed to prevent pinching of optical ribbon fiber F and will close to define a bore 62 of a predetermined size which will act to propagate the delamination through the geometry distortion when die 60 is held in one hand and optical ribbon fiber F is pulled with the other hand along a relatively longer second selected midspan portion of optical ribbon fiber F (see FIG. 10). Optionally, the preferred practice of the invention is to then urge clam shell die 60 back along the second selected midspan delaminated portion back to the original starting point of the delaminated portion of optical ribbon fiber F.

Now that complete delamination has been achieved along the second selected midspan portion of fiber F, tip 72 of extraction tool 70 is used to penetrate the matrix encapsulant "tube" and open a small window therethrough to optical fibers OF therein. Tip 72 of extraction tool 70 is then inserted between one or more selected optical fibers OF of interest and the remaining optical fibers 0F carried within optical ribbon fiber F (see FIG. 11) so that the selected optical fibers extend across the surface of tool tip 72. Next, selected optical fibers OF are removed from the encapsulant "tube" by lifting tip 72 from within the encapsulant, and longitudinally sliding extraction tool 70 between the encapsulant and selected optical fibers OF (see FIG. 12). Finally, extraction tool 70 is slidably urged along the length of the delaminated second selected midspan portion so as to lift selected optical fibers OF out of the matrix encapsulant "tube" for the entire second selected midspan length (see FIG. 12). Thus, selected optical fibers OF are now accessible by the optical fiber technician.

Once again applicant wishes to emphasize that although the immediately aforementioned procedure utilizing clam shell die 60 is intended for midspan entry of an optical ribbon fiber, the process of the invention can also be practiced for ribbon end entry of an optical ribbon fiber utilizing the same procedure disclosed herein (but preferably using die 50 in lieu of clam shell die 60).

Preferred Optical Ribbon Fiber Properties For Use With Midspan Entry Method

Figure 13:
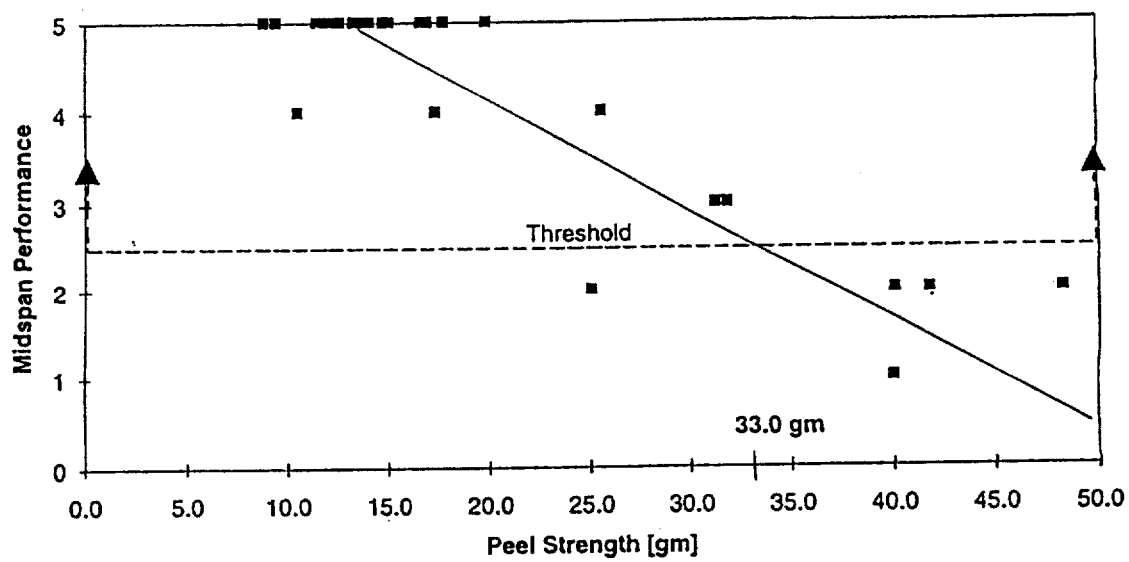
FIG. 13 is a graph of midspan entry performance of an optical ribbon fiber vs. peel strength.
Figure 14:
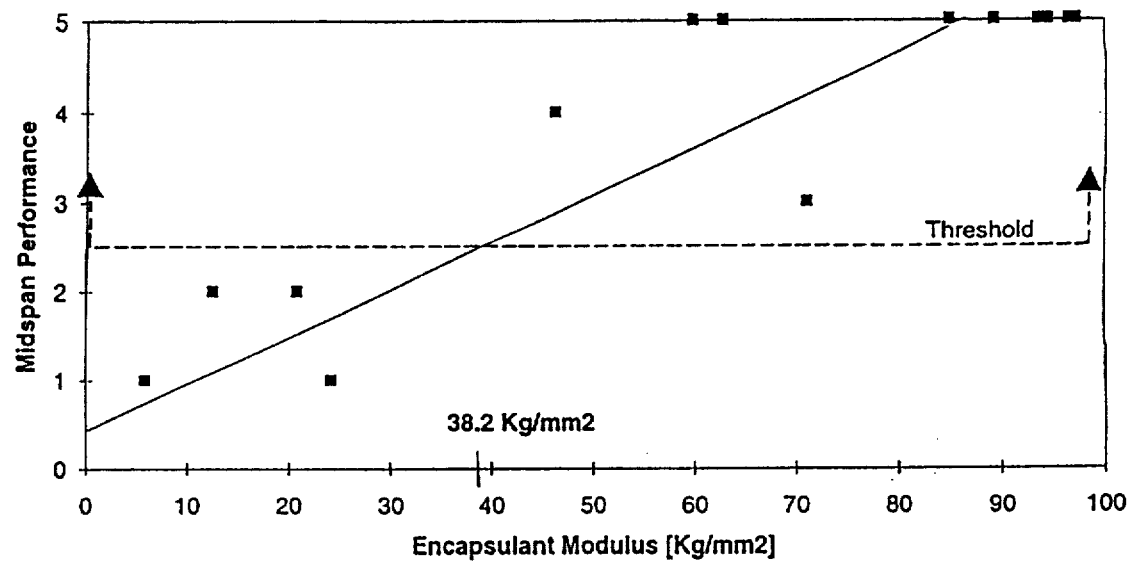
FIG. 14 is a graph of midspan entry performance of an optical ribbon fiber vs. encapsulant matrix modulus.

Referring to FIG. 13 and 14, the method described hereinabove has been determined by applicants to have particular efficacy when used on optical ribbon fibers designed to have certain defined values for peel strength and encapsulant modulus. Although the novel method will work to some degree on optical ribbon fibers possessing peel strength and encapsulant modulus values outside of the pertinent ranges discovered by applicants, use of optical ribbon fiber designed to possess peel strength and encapsulant modulus within the ranges discovered by applicants ensures proper performance of the novel procedure for midspan entry.

More specifically, applicants have discovered that two (2) properties of an optical ribbon fiber structure are particularly significant in ensuring the proper performance of the midspan entry method described hereinabove. These properties are (1) the "peel strength" or force required to peel one side of the encapsulant away from the plurality of optical fibers and (2) the "encapsulant modulus" or the sheer strength of the layer of encapsulant material.

It has been discovered that the peel strength must be less than the encapsulant modulus for the encapsulant to be properly peeled from the optical ribbon fiber. However, the peel strength must be great enough to prevent unwanted or uncontrolled encapsulant peeling due to normal handling of the optical ribbon fiber in the field. Thus, peel strength must be sufficient to resist peeling due to bending, twisting and temperature aging stresses which are encountered in typical applications of the optical ribbon fiber.

Furthermore, the encapsulant modulus must be low enough for the encapsulant to be easily torn or cut when midspan entry is completed in accordance with the inventive method.

As can be seen with reference to the testing results set forth in FIGS. 13 and 14, applicants have unexpectedly discovered that an optical ribbon fiber having a peel strength in the range of 5.0 to 33.0 gm and an encapsulant modulus equal to or greater than 38.2 Kg/mm$^2$ will ensure proper functionality of the midspan access procedure of the instant invention. Preferably, the peel strength is in the range of 8.0 to 25.0 gm and the encapsulant modulus equal to or greater than 50.0 Kg/mm$^2$ for optimal performance of the midspan access procedure. Optical ribbon fiber having the peel strength and encapsulant strength properties described herein can be incorporated into many cable constructions including single central tube, stranded loose tube and slotted core cables.

Although other methods could be used, applicants prefer to measure peel strength in the following manner using an INSTRON tensile test bench. Attached to the base grip is a flat plate with double-sided adhesive tape placed lengthwise along the plate. The plate is positioned horizontally with the flat side facing upward. Next, a peel of the optical ribbon fiber is initiated by suitable means, and the optical ribbon fiber then affixed to the adhesive tape. The partially delaminated fibers are then lifted and affixed into the upper INSTRON clamp. Crosshead movement and ribbon peel are initiated and force versus distance is measured along the length of the tape. The point at which peel direction is 90° (straight up) is marked or calculated and a linear line is fit to the data accumulated over the entire pull. The 90° peel force from the linear fit is recorded, and conventional ASTM rules for sampling and curve fitting are then followed. Encapsulant modulus is best measured by following ASTM 882–83 and specifying the secant modulus at 2.5% elongation.

Summarily, applicants have discovered a highly desirable new method for midspan entry of optical ribbon fiber as well as the necessary peel strength and encapsulant modulus properties required of an optical ribbon fiber for ensuring the proper performance of the optical ribbon fiber in accordance with the novel method for midspan entry.

It will be understood that various details of the invention may be changed without departing from the scope of the invention. Furthermore, the foregoing description is for the purpose of illustration only, and not for the purpose of limitation—the invention being defined by the claims.

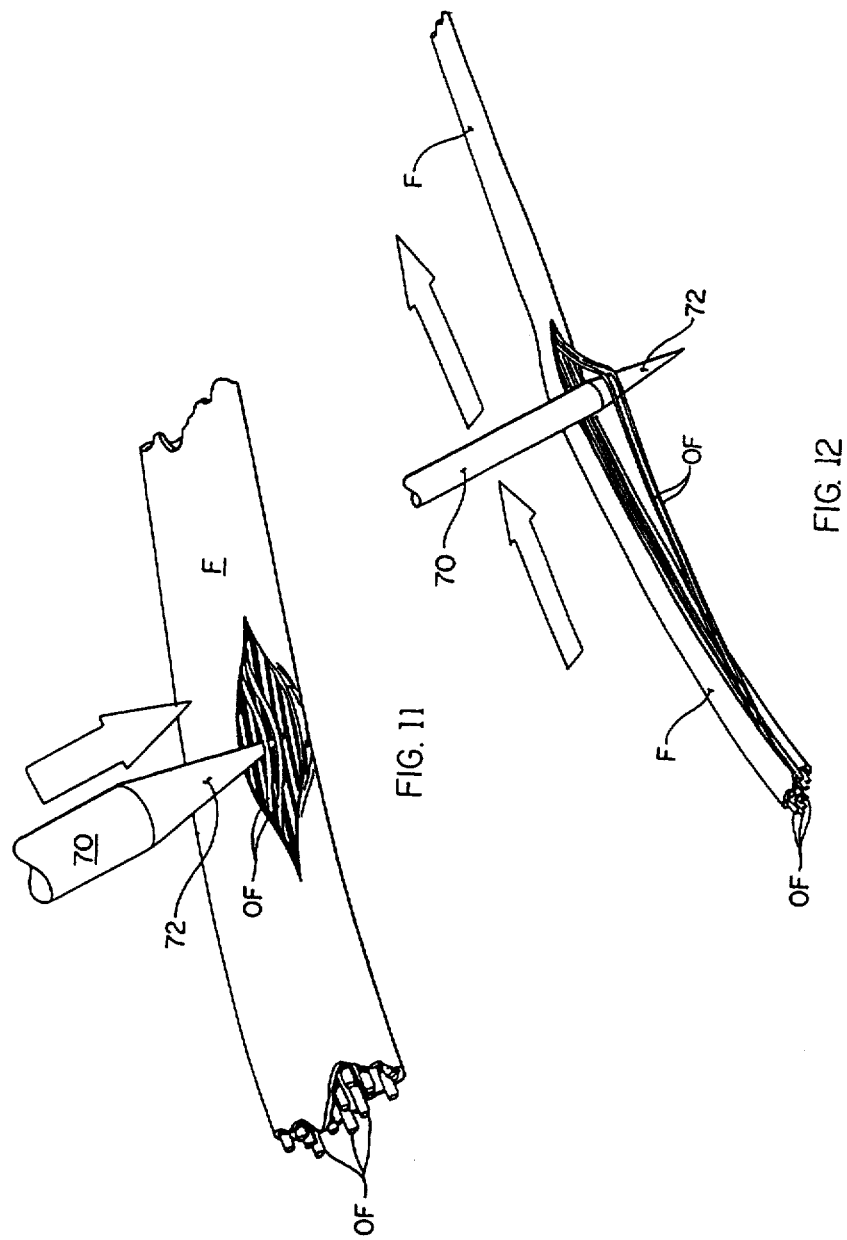

What is claimed is:

1. An optical ribbon fiber comprising a common encapsulant and a plurality of optical fibers contained within said common encapsulant and characterized in that it is particularly well suited for a friction abrading-type delamination midspan entry procedure, said optical ribbon fiber having a peel strength between about 4.0 and 33.0 gm and an encapsulant tensile modulus greater than 38.2 kg/mm$^2$, wherein said peel strength is less than said encapsulant strength.

2. An optical ribbon fiber according to claim 1 wherein most preferably said peel strength is about 8.0–25.0 gm and said encapsulant modulus is greater than 50.0 Kg/mm$^2$.

3. An optical ribbon fiber according to claim 1 including a cable formed from a plurality of said optical ribbon fibers.

4. A method of removing the common encapsulant from a selected span of optical ribbon fiber to provide access to one or more selected optical fibers within said optical ribbon fiber comprising initiating friction abrading-type delamination of the common encapsulant from the optical fibers and propagating the delamination along at least a portion of the remaining span length of the optical ribbon fiber wherein the optical ribbon fiber has a peel strength between about 5.0 and 33.0 gm and an encapsulant modulus tensile greater than 38.2 kg/mm$^2$, and wherein said peel strength is less than said encapsulant modulus.

5. A method according to claim 4 wherein most preferably said peel strength is between about 8.0 and 25.0 gm and said encapsulant modulus greater than 50.0 Kg/mm$^2$.

6. A method of removing encapsulant from a selected span of optical ribbon fiber and accessing one or more selected optical fibers carried within said optical ribbon fiber, said method comprising:

(a) providing an optical ribbon fiber having a peel strength between about 5.0 and 33.0 gm and an encapsulant modulus greater than 38.2 Kg/mm$^2$;

(b) friction abrading of the top and bottom surfaces of a first selected span of said optical ribbon fiber to initiate delamination of the bond between the optical fibers carried within said optical ribbon fiber and the encapsulant therearound;

(c) completing delamination of the bond between the optical fibers and the encapsulant therearound in the first selected span of said optical ribbon fiber by applying a rolling force to the circumference of the first selected span of said optical ribbon fiber;

(d) propagating the delamination of the bond between the optical fibers and the encapsulant therearound in the first selected span by introducing the first selected span into the bore of a die element and urging the die element along a relatively lengthier second selected span of said optical ribbon fiber;

(e) inserting the tip of an elongated tool through the encapsulant of a selected area within the second selected span of said optical ribbon fiber and between said one or more selected optical fibers and the remaining optical fibers carried within said optical ribbon fiber so that said one or more selected optical fibers extends across the top surface of the tip of the elongated tool;

(f) lifting the tip of the elongated tool from within the encapsulant of said optical ribbon fiber so as to remove said one or more selected optical fibers from the encapsulant, and inserting the elongated tool with said one or more selected optical fibers extending thereover between the encapsulant and said one or more selected optical fibers; and (g) sliding the elongated tool along the length of the delaminated second selected span so as to lift said one or more selected optical fibers out of the encapsulant of the second selected span.

7. The method of claim 6 wherein the first selected span is a midspan portion of said optical ribbon fiber.

8. The method of claim 6 wherein the first selected span is an end portion of said optical ribbon fiber.

9. The method of claim 6 wherein said friction abrading comprises abrading the first selected span with an abrasive instrument while the first selected span is fixedly secured within a groove in a base plate.

10. The method of claim 9 including providing a resilient pad in the bottom of the groove of the base plate.

11. The method of claim 6 wherein the rolling force is applied by rolling the first selected span between the thumb and forefinger.

12. The method of claim 6 further including, subsequent to said propagating step, urging the die element backward along the second selected span of said optical ribbon fiber to its original starting position.

13. The method of claim 6 wherein the die element defines a bore having a diameter between about 0.055 to 0.065 inches.

14. The method of claim 6 wherein the elongated tool is a non-metallic pointed instrument.

15. The method of claim 6 wherein said optical ribbon fiber comprises twelve (12) optical fibers.

16. The method of claim 15 wherein the encapsulant of said optical ribbon fiber comprises a UV curable matrix material.

* * * * *

UNITED STATES PATENT AND TRADEMARK OFFICE
CERTIFICATE OF CORRECTION

PATENT NO. : 5,604,834
DATED : February 18, 1997
INVENTOR(S) : William E. Beasley et al.

It is certified that error appears in the above-indentified patent and that said Letters Patent is hereby corrected as shown below:

In the drawings:
Sheets 7 of 9 thru 9 of 9 should be deleted and replaced with the attached sheets.

Signed and Sealed this

Third Day of June, 1997

Attest:

BRUCE LEHMAN

Attesting Officer

Commissioner of Patents and Trademarks